(12) United States Patent
Akkapeddi et al.

(10) Patent No.: US 12,306,850 B2
(45) Date of Patent: *May 20, 2025

(54) SYSTEM AND METHOD FOR EXTRACTION MANAGEMENT

(71) Applicant: Bank of America Corporation, Charlotte, NC (US)

(72) Inventors: Naga Vamsi Krishna Akkapeddi, Charlotte, NC (US); Awan Nord, Costa Mesa, CA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/665,374

(22) Filed: May 15, 2024

(65) Prior Publication Data

US 2025/0061125 A1 Feb. 20, 2025

Related U.S. Application Data

(63) Continuation of application No. 18/449,370, filed on Aug. 14, 2023, now Pat. No. 12,026,173.

(51) Int. Cl.
| | |
|---|---|
| *G06F 16/25* | (2019.01) |
| *G06F 16/90* | (2019.01) |
| *G06F 16/906* | (2019.01) |
| *G06F 16/93* | (2019.01) |

(52) U.S. Cl.
CPC ......... *G06F 16/254* (2019.01); *G06F 16/906* (2019.01); *G06F 16/93* (2019.01)

(58) Field of Classification Search
None
See application file for complete search history.

(56) References Cited

U.S. PATENT DOCUMENTS

| | | | |
|---|---|---|---|
| 8,527,376 B1 * | 9/2013 | Bueche, Jr. | ............. G06F 16/93 |
| 9,298,813 B1 | 3/2016 | Kraley | |
| 9,785,793 B2 | 10/2017 | Lacey | |
| 9,792,277 B2 | 10/2017 | Srinivasan | |
| 9,836,470 B2 | 12/2017 | Gomez et al. | |
| 10,073,859 B2 | 9/2018 | Hull et al. | |
| 10,182,073 B2 | 1/2019 | Redlich et al. | |
| 10,210,384 B2 | 2/2019 | Yellapragada et al. | |
| 10,417,440 B2 | 9/2019 | Reedy et al. | |
| 10,979,458 B2 | 4/2021 | Narayanaswamy et al. | |
| 11,087,077 B2 | 8/2021 | Wheaton et al. | |
| 11,226,938 B2 | 1/2022 | Madisetti et al. | |
| 11,379,861 B2 | 7/2022 | Mohan et al. | |
| 11,397,744 B2 | 7/2022 | Wan et al. | |

(Continued)

*Primary Examiner* — Son T Hoang

(57) ABSTRACT

A system for extracting and providing information from a source document includes a memory and a processor. The memory stores data associated with the source document. The processor is configured to extracts data from the source document and stores that extracted data as a first extracted data in the memory. When a request for information is received, the processor then determines if the first extracted data includes all the requested information and if it does not, the processor extracts second extracted data from the image file and stores the second extracted data along with the first extracted data and the image file in the memory. The requested information is then provided to the requesting process from the first and second extracted data.

20 Claims, 4 Drawing Sheets

(56) References Cited

U.S. PATENT DOCUMENTS

| | | | |
|---|---|---|---|
| 11,470,074 B2 | 10/2022 | Lacey et al. | |
| 11,532,397 B2 | 12/2022 | Lucas et al. | |
| 11,574,023 B2 | 2/2023 | Elkhou et al. | |
| 2007/0286530 A1* | 12/2007 | Asasaka | G06F 16/25 |
| 2013/0179172 A1* | 7/2013 | Nakamura | G06F 16/58 |
| 2014/0289675 A1* | 9/2014 | Stading | G06F 16/3331 |
| 2018/0121524 A1* | 5/2018 | Yousaf | G06F 16/248 |
| 2018/0239507 A1 | 8/2018 | Bui et al. | |
| 2019/0197169 A1* | 6/2019 | Brewinski | G06F 16/27 |
| 2021/0200723 A1 | 7/2021 | Joneja | |

\* cited by examiner

SYSTEM AND METHOD FOR EXTRACTION MANAGEMENT

CROSS-REFERENCE TO RELATED APPLICATION

The application is a continuation of U.S. patent application Ser. No. 18/449,370, filed Aug. 14, 2023, entitled "SYSTEM AND METHOD FOR EXTRACTION MANAGEMENT," which is incorporated herein by reference.

TECHNICAL FIELD

The present disclosure relates generally to computational systems, and more specifically to a system and method for intelligent interaction management.

BACKGROUND

Existing computer systems for processing documents and extracting useful information for use by various end users are inefficient. Frequently the information needs change as the requirements of the end users change. Typically, when a new document, image, or video is encountered, predetermined data is extracted from it based on either the current needs of an end user and/or an administrator's best guess of what may be needed. When a new end user requests information, the document, image, or video may have to be reprocessed to obtain the information needed for that new end user. This approach is hardware intensive and consumes a significant amount of memory and processing resources of computing devices that processes the documents. Further, the extracted information is subject to retention policies and other rules which may also change over time, resulting in the need to frequently modify any previously extracted information. The existing approaches results in storage of redundant data and constant use of resources to provide information to requesting processes.

SUMMARY

The system disclosed in the present application provides a technical solution to the technical problems discussed above by providing the capability to store data extracted from a source document such as raw data, a written document, an image, video, or other source of information, along with the source of information such as the image or video itself that is provided or uploaded. Further, when new requests for information are received that require additional data, the image, audio, and/or video of the source document is readily available and only the additional data may need to be extracted. The new, as well as the old, requests may then receive the requested information from the extracted data and additional data. The disclosed system provides several practical applications which include: (a) a process for extracting the data and updating the data when new requests are received; (b) modifying the extracted data when changes occur in data retention policies as well as changes in regulations concerning the document or end users; and (c) updating or changing the rules for extracting the data as changes occur in the regulations as well as new requests are received. This approach provides better resource utilization and a higher throughput compared to existing approaches that require extracting all the data every time a new request for information is received while still being able to meet data retention and regulatory requirements.

In one embodiment, the disclosed system includes a memory that stores data associated with a source document and a processor. The processor is configured to receive the source document and store the source document in the memory as a machine-readable image. The source document may take the form of a physical document, an electronic document, a plaintext document, server logs, an image, video, or any other form without departing from the disclosure. The machine-readable image, which may include a transcribed video or document, is then used by the processor to classify the source document as one of a plurality of document types. Based on the determined document type, the processor may extract data from the machine-readable image in accordance with rules established for that document type. The extracted data is then stored along with the image file in the memory. When a request for information is received, a determination is made, by the processor, establishing if previously extracted data includes all the requested information. If it is determined that the previously extracted data does not include all the information, the image file is retrieved, and the additional requested information is extracted. That additional extracted data is then stored with the initial extracted data and the image file. By storing initial extracted data along with the additional extracted data, any future requests will be able to retrieve information from the previously and additional extracted data without needing to access the source document or store redundant data.

The system is further configured to perform pre-processing of the source document when it is determined that the source document is not a machine-readable image. The preprocessing includes scanning the source document when it is a physical file to make it into an image file. Image files are converted to a predetermined machine-readable image types which may include performing optical character recognition (OCR), transcription, watermarking, cropping, object recognition, or other process on the image file, video file, or other type of input. This may be done using conventional algorithms and processes or with the aid of various machine learning processes.

The system also updates the set rules associated with a document type. The rules may determine what information to extract for a document type, how long to preserve the data, what data may be provided to certain process based on the process's permissions, roles, and other considerations. The rules are updated when document retention, regulatory related, and/or other requirements require changes to the rules. When the rules are changed, the stored data may need to be modified. The modification may include deleting data that should no longer be retained or may include requesting that additional data be extracted. Additionally, the rules are updated when new requests are received so that any future documents received have all the data extracted for both the old requests and new requests.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Data Extraction and Storage System Overview

Figure 1:
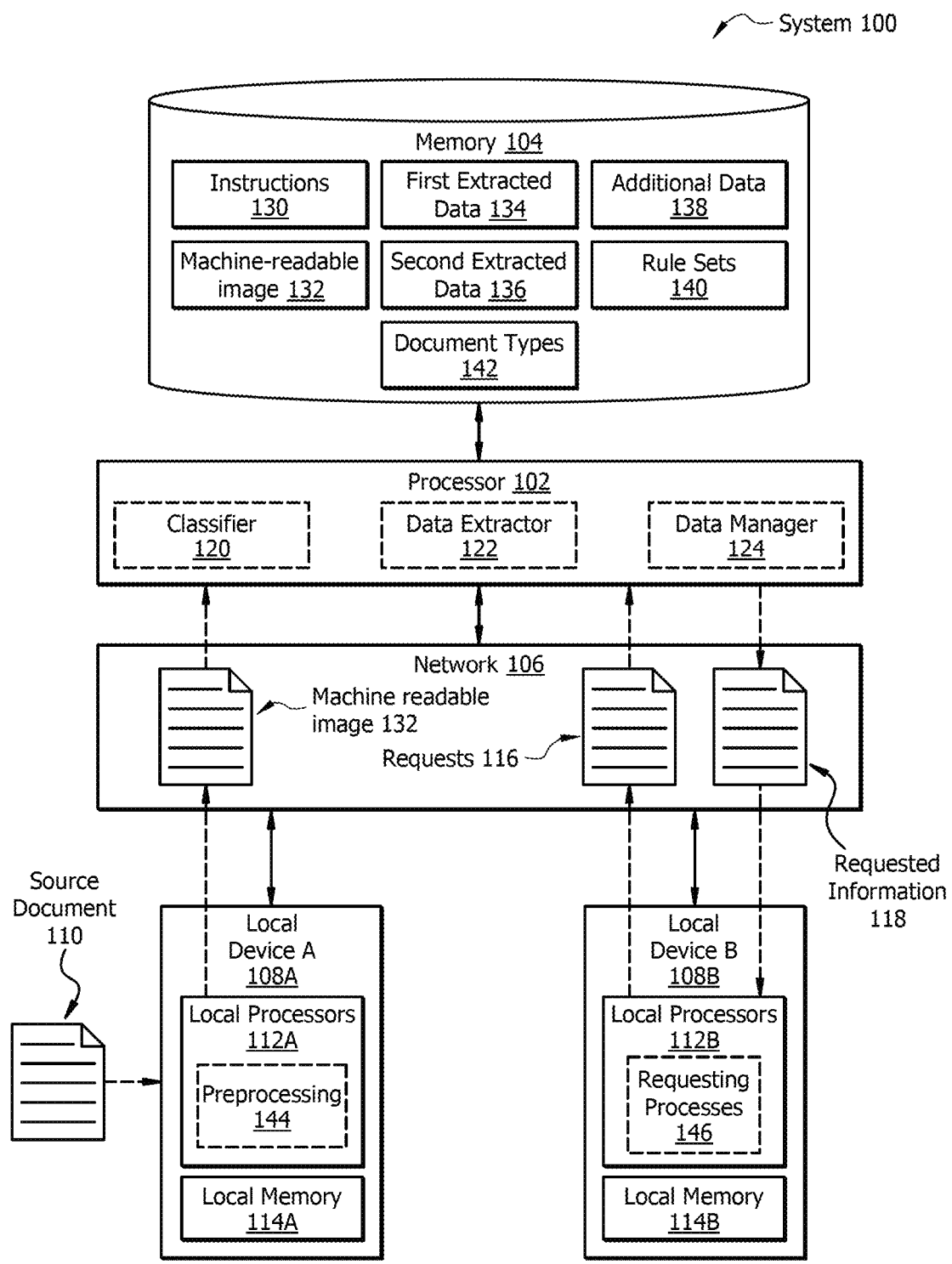
FIG. 1 is one embodiment of a system configured to store data related to a new source document in a memory.

FIG. 1 is a schematic diagram of a document processing system 100 that is configured to receive source documents 110 and provide requested information 118, extracted from them to one or more requesting processes 146. More specifically, the document processing system 100 is configured to pre-process a source document 110, convert it to a machine-readable image 132, determine the document type 142, and extract first extracted data 134 from the machine-readable image 132 of the source document 110 based on rule sets 140 associated with the document type 142. The first extracted data 134 is then stored for future use and for providing requested information 118 that is requested by requesting processes 146. The document processing system 100 is further configured to extract additional data 138 which may include second extracted data 136 when new requests 116 are received and/or changes in the rule sets 140 associated with a document type 142 occur. This process reduces the need for repeatedly processing a source document 110 whenever requests 116 for additional requested information 118 is received by the processor 102.

In one embodiment, the document processing system comprises a processor 102 and a memory 104 that are in signal communication with the local devices 108A and 108B connected through a network 106. The document processing system 100 may be configured as shown or in any other suitable configuration.

The network 106 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 106 may be configured to support any suitable type of communication protocol as would be appreciated by one of ordinary skill in the art.

Local Devices

Examples of local devices 108A and 108B include, but are not limited to, computers, laptops, mobile devices (e.g., smart phones or tablets), servers, clients, or any other suitable type of device. The local devices 108A and 108B includes at least one local processor 112A and 112B that performs one or more processes or operations, such as but not limited to, preprocessing operations 144 and/or requesting processes 146. Each local device 108A and 108B may also include at least one local memory 114A and 114B for storing instructions for performing operations such as pre-processing operations 144 and one or more requesting processes 146. The local memory 114B may also store the requested information 118 for use by the local processor 112B when the requested information 118 is received from the processor 102 over the network 106. While FIG. 1 only shows each local device 108A and 108B including a single local processor 112A and 112B and a single local memory 114A and 114B, they may include any suitable number and combination of local processors 112A and 112B and local memories 114A and 114B as well as other necessary components; with only one local processor e.g., 112A and one local memory e.g., 114A for each local device e.g., 108A being shown in FIG. 1 for simplicity.

At least one of the local devices 108A receives a source document 110 and after local processor 112A performs a preprocessing operation 144, the local device 108A forwards the machine-readable image 132 to the processor 102. Other local devices 108B and/or the same local device 108A may include at least one local processor 112B that performs one or more requesting processes 146 that send requests 116 to the processor 102 and obtain requested information 118 that is produced by the processor 102 from the source document 110. While only two local devices 108A and 108B are shown, in general the document processing system 100 may include any suitable number and combination of local devices e.g., 108A; with only two being shown in FIG. 1 for simplicity.

The source document 110 may take many different forms and while only one source document 110 is shown, the system may process multiple source documents 110 at any given time. The source document is not restricted to paper documents and may take any form including as raw data, plaintext documents, server logs, JSON data, online forms, event streams, images, video, audio, or other sources of information that a user, administrator, or other party has generated or captured and has determined needs to be retained and/or have data extracted from it. A source document 110 may be a physical document, such as, in a non-limiting example, a paper check, a handwritten letter, a carbon copy of a document, or other types of documents that are in the form of a physical document. Alternatively, the source document 110 may be an electronic document, such as, but not limited to a word processing document, an online form, a system log, portable document format (PDF) document, an image, a video, an audio file, or any other electronic document or source of information. The source document 110 may have been created by the local device 108A or received from an outside source. The source document 110 may be received and/or created by different local devices 108A and 108B, which may or may not be co-located in the same geographical area.

The local processor 112A when performing preprocessing operations 144, converts the source document 110 to an appropriate machine-readable image 132 which is in an image format such as, but not limited to, a PDF, or any other useful image format such as a transcribed video or audio file formats. When the source document 110 is a physical document, the preprocessing operation 144 may also include scanning using a scanner, camera, or other means (not shown). Preprocessing operation 144 may involve performing optical character recognition (OCR) on the image of the source document 110 to convert the source document 110 into a machine-readable image 132. Other types of documents such as system logs or plain text documents may have appropriate preprocessing operations 144 performed by the local processors 112A. Preprocessing operations 144 may also include, when the source document 110 is an image, audio, or other multimedia file, having the local processors 112A produce a transcript, perform facial recognition, perform emotion state recognition, or other forms of preprocessing.

Preprocessing operation 144 may take the form of one or more applications that work together. The applications may include the use of natural language processing, one or more trained machine learning algorithms such as deep learning, neural networks such as but no limited to convolutional neural network (CNN), long short-term memory (LSTM), recursive neural networks (RNN), multilayer perception (MLP), or any other useful machine learning or artificial intelligence algorithms. The applications performing preprocessing operations 144 may be executed by local processors 112A and local memory 114A associated with the local device 108A or alternatively the preprocessing operations 144 may be performed by specific preprocessing processors that may take the form of application specific integrated circuits (ASIC). The local processors 112A performing the preprocessing operation 144 may be co-located with the local device 108A or hosted by a separate device including the processor 102 or any other device connected through the network 106 such as, but not limited to, a datacenter or cloud computing environment (not shown).

Once the source document 110 is converted by the local processors 112A into a machine-readable image 132, it is forwarded through the network 106 to the processor 102, which, as will be described in more detail below, processes the machine-readable image 132 and extracts a first extracted data 134. The first extracted data 134 as well as second extracted data 136 may include text or other information extracted from specific portions of the machine-readable image 132 by the processor 102 performing data extractor operations 122. The first extracted data 134 and/or the second extracted data 136 may be stored in a form that allows for easy manipulation by the processor 102 such as plain text and/or other forms as indicated by the rule sets 140, requests 116, and/or based on the specific structure of the memory 104. The first extracted data 134 and/or second extracted data 136 is then used by the processor 102 to provide requested information 118 which is sent through the network 106 to the same or different local device 108B that hosts the one or more requesting processes 146.

The requesting processes 146 request information 118 from the processor 102, and the requested information 118 may be associated with one or more source documents 110. The requesting processes 146 may comprise of applications executed by local processors 112B and local memory 114B associated with the local device 108B. The requesting processes 146, alternatively or in addition, may take the form of data requests received by the local processors 112B from a user or government entity such as, but not limited to, a regulator, or any other process or request that is authorized and has need of requested information 118 obtained from the one or more source documents 110.

Processor

The processor 102 receives and/or processes the machine-readable image 132 from the local device 108A. The processor 102 may take the form of any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 102 may be a programmable logic device, a microcontroller, a microprocessor, or any suitable combination of the preceding. The processor 102 is communicatively coupled to and in signal communication with the memory 104. The one or more processors are configured to process data and may be implemented in hardware or software. For example, the processor 102 may be 8-bit, 16-bit, 32-bit, 64-bit or of any other suitable architecture. The processor 102 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The processor 102 is in operative communication with memory 104. The processor 102 is configured to implement various instructions 130 stored in the memory 104. The processor 102 may be a special purpose computer designed to implement the instructions 130 and/or functions disclosed herein. For example, the processor 102 may be configured to perform the operations of the methods described in FIGS. 2-4.

Additionally, the processor 102 executes instructions 130 to perform a series of one or more operations on the machine-readable image 132, first extracted data 134, and second extracted data 136. The operations may include a classifier operation 120, a data extractor operation 122, and a data manager operation 124. The processor 102 may perform more or less operations then shown in FIG. 1, and the specific operations shown are only examples. While only a single processor 102 is shown, the processor 102 may include a plurality of processors or computational devices. These operations 120-124 may be performed by a separate processor or software application executed on a single computational device e.g., processor 102, or they may be located on separate servers and/or even separate datacenters such as a cloud server and/or the local devices e.g., 108A.

The processor 102 receives the machine-readable image 132 from the local device 108A through the network 106. The machine-readable image 132 is first analyzed by processor 102 in conjunction with classifier operations 120 to determine what type of document the source document 110 is. For example, in one non-limiting example, if the system is being used for financial record keeping, the processor 102 may determine if the source document 110 is a receipt, a check, invoice, a credit application, mortgage application, or other financial related documents. The classifier operation 120 may be used for any type of record keeping or other functions that require the storage of documents and the extraction of data from them, including but not limited to those used for financial or business purposes, legal purposes, archiving purposes, educational purposes, and/or other purposes or applications.

Once the machine-readable image is classified, processor 102 performs data extractor operations 122 to extract first extracted data 134 from the machine-readable image 132 based on the rule sets 140 for the particular document type 142 as determined during the classifier operation 120. The data extractor operations 122 may be performed by the processor 102 automatically and/or alternatively when a user or process request them. The data extractor operations 122 may comprise of operations performed by the processor 102 or may comprise of operations performed by one or more external processors and/or users (not shown) which receive a request from the processor 102 to perform one or more data extractor operations 122. The data extractor operations 122 may comprise of simple extracting data from one or more fields of a text document. For example, if the source document 110 is a check, the processor 102 when performing data extractor operations 122, may extract from the machine-readable image 132 first extracted data 134 and/or second extracted data 136 that may comprise of a bank routing number, account number, deposit amount, account holder's address, image of the account holder's signature, and any other useful information that may be gleamed from the machine-readable image 132 by the processor 102, based on one or more rule sets 140.

The data extractor operations 122 may comprise of having the processor 102 use one or more machine learning or artificial intelligence algorithms to extract useful data. For example, one or more trained machine learning algorithms such as deep learning, neural networks such as but no limited to convolutional neural network (CNN), long short-term memory (LSTM), recursive neural networks (RNN), multilayer perception (MLP), or any other useful machine learning or artificial intelligence algorithms may be used to extract mood, perform object recognition, determine patterns, or other processes/data extractions. In another non-limiting example if the source document 110 is a video of a user talking to another user, such information as each user's mood, a transcript of their conversation, and other useful information may be extracted and added to first extracted data 134 and/or second extracted data 136 by the processor 102 performing data extractor operations 122. In yet another non-limiting example, when the source document 110 is in the form of a letter, such information as the recipient's address, the sender's name and address, date, and any pertinent information from the text of the letter may be added to first extracted data 134 and/or second extracted data 136 by the processor 102 performing data extractor operations 122.

As will be discussed in more detail with regards to the methods shown in FIGS. 2-4, the rule sets 140 may be based on pre-established rules such as those required by document retention policies and regulatory requirements. The rule sets 140 may also indicate which requesting processes 146 may have access to certain types of requested information 118. For example, in a non-limiting example, the rule sets 140 may indicate that one type of user may only have access to the last 4 digits of a social security number while other users with higher security or need may have access to the entire social security number. The rule sets 140 may additionally or alternatively include instructions to produce multiple versions of the same first extracted data 134 and/or second extracted data 136 that reflect different access levels or permissions. For example the rule sets 140 may require that a physical document may have data extracted by the processor 102 in a first version that auto-masks certain some sensitive information in the document that should not be provided to un-authorized local devices 108B and/or their users, while having a second version that does not mask the sensitive information in order to provide this to local devices 108B and/or their users that do have appropriate permissions. For example, in a non-limiting example, a system log that includes user passwords may have the length of the passwords extracted for providing to a requesting process 146 that is concerned with password rule compliance, while including the entire password for a second requesting process 146 which is concerned with restoring access to a user that has lost their password.

The rule sets 140 may also include indications or rules reflecting the requested information 118, that has been or currently is, part of requests 116 from the source documents 110 of a particular document type 142 by various preexisting and/or current requesting processes 146. For example, if the source document 110 is an invoice, previous requesting processes 146 may send requests 116 for the business's name, the total amount being charged, and other data required for regulatory purposes, to the processor 102.

Once first extracted data 134 is extracted based on the rule sets 140, by the processor 102 performing data extractor operations 122, it is saved in the memory 104 by the processor 102, whereby the processor 102 routes the data to the memory 104 where the first extracted data 134 is stored along with the machine-readable image 132 of the source document 110. When a request 116 is received from a requesting process 146 for requested information 118 from the source document 110 and/or a plurality of source documents 110 of the same type, processor 102 performs a data manager operation 124 to retrieve the first extracted data 134. The processor 102 may, optionally, send a message to the local device 108B indicating that the requests 116 are being processed and/or an estimate of how long it will take to provide the requested information 118.

If the first extracted data 134 does not include all the requested information 118 for the request 116, then the processor 102, performing the data manager operation 124, also retrieves the machine-readable image 132 from the memory 104. The processor 102 performing the data extractor operation 122 may then extract the additional data 138. This additional data 138 is then stored as a second extracted data 136 along with the machine-readable image 132 and any previously extracted data such as the first extracted data 134 in the memory 104. Once any extracted data, including first extracted data 134 and second extracted data 136 and the machine-readable images 132 of the source document 110, is stored in the memory 104, processor 102 performing the data manager operation 124 may then provide the requested information 118 to the one or more requesting processes 146 being executed by the local processors 112B located at the local device 108B.

If at some point a change in regulations, data retention policies occur, or changes or upgrades in the algorithms used by the processor when performing data extractor operations 122 for a specific document type 142, it may be prudent to modify the first extracted data 134 and second extracted data 136 stored in the memory 104. When such a change occurs, the processor 102 performing the data manager operation 124 may modify and/or delete elements of the first extracted data 134 and second extracted data 136 that is subject to the change or is no longer to be stored. The processor 102 may also perform additional or replacement data extractor operations 122 when an algorithms or other process used during the extractor operations is updated or changed. When performing additional or replacement data extractor operations 122, the processor 102 may cause the memory 104 to store more than one version or revision of the first extracted data 134 and/or second extracted data 136. Further the processor 102 may monitor the first extracted data 134 and second extracted data 136 to ensure that the previously extracted data requested by the current rule sets 140 is still available. The processor 102 may also monitor that the first extracted data 134 and the second extracted data 136 does not contain redundant information. The processor 102 may also determine when the first extracted data 134 and/or second extracted data 136 is no longer frequently being used and archive it to save storage space in the memory 104. The processor 102 performing the data manager operation 124 may perform other processes such as backing up the first extracted data 134 and second extracted data 136, analyzing the first extracted data 134 and second extracted data 136 for cybersecurity purposes, and any other processes that are helpful based on the rule set 140 or instructions received from a user, administrator, developer, and/or other concerned party, without departing from the disclosure.

Memory

Memory 104 may be any type of storage for storing a computer program comprising instructions 130 and first extracted data 134, second extracted data 136, and machine-readable images 132. The memory 104 may be a non-transitory computer-readable medium that is in operative communication with the processor 102. The memory 104 may be one or more disks, tape drives, or solid-state drives. Alternatively, or in addition, the memory 104 may be one or more cloud storage devices. The memory 104 may also be used as an over-flow data storage device, to store applications when such applications are selected for execution, and to store instructions and data that are read during the execution of the applications. The memory 104 may be volatile or non-volatile and may comprise read-only memory (ROM), random-access memory (RAM), ternary content-addressable memory (TCAM), dynamic random-access memory (DRAM), and static random-access memory (SRAM).

Figure 2:
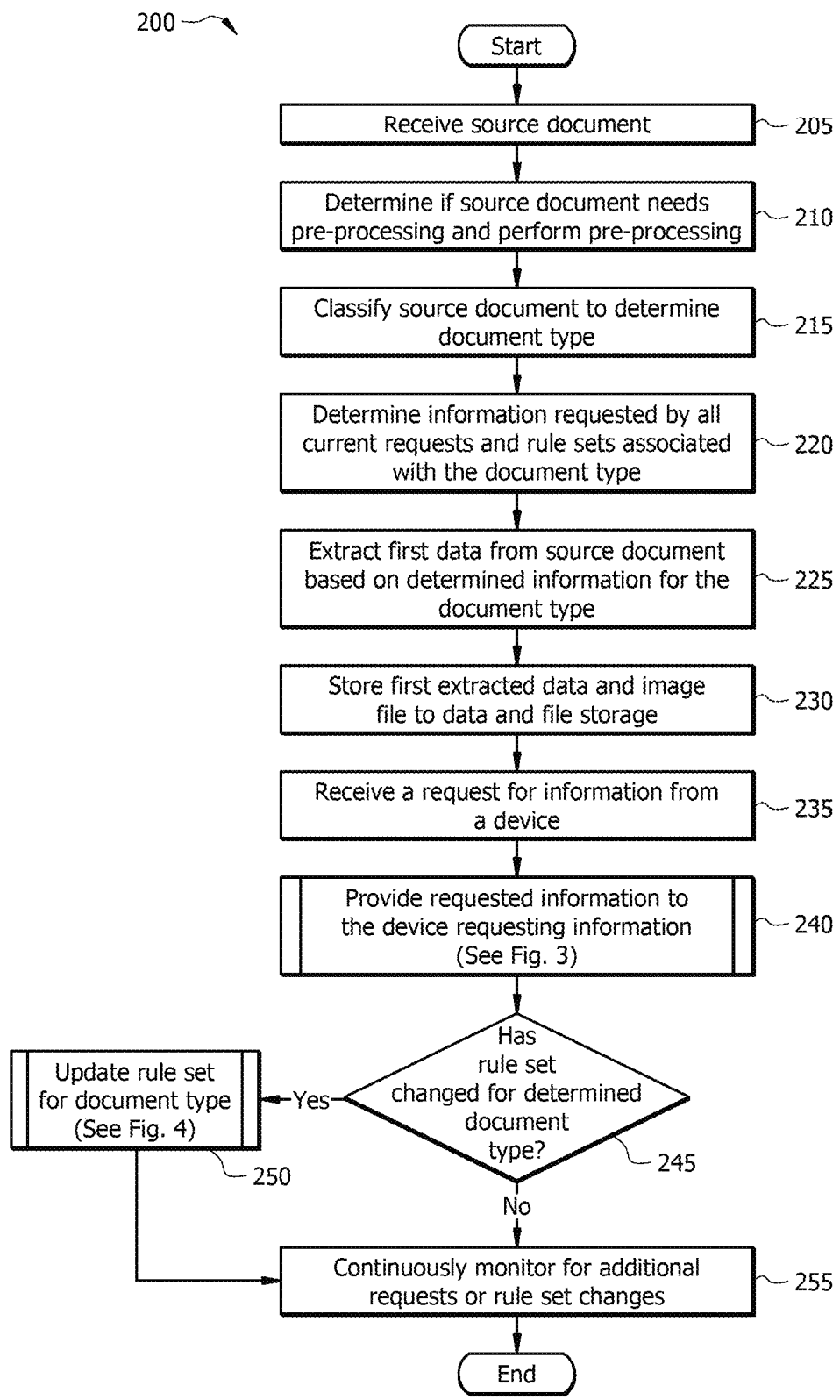
FIG. 2 is one embodiment of a method of source document classification and extraction.
Figure 3:
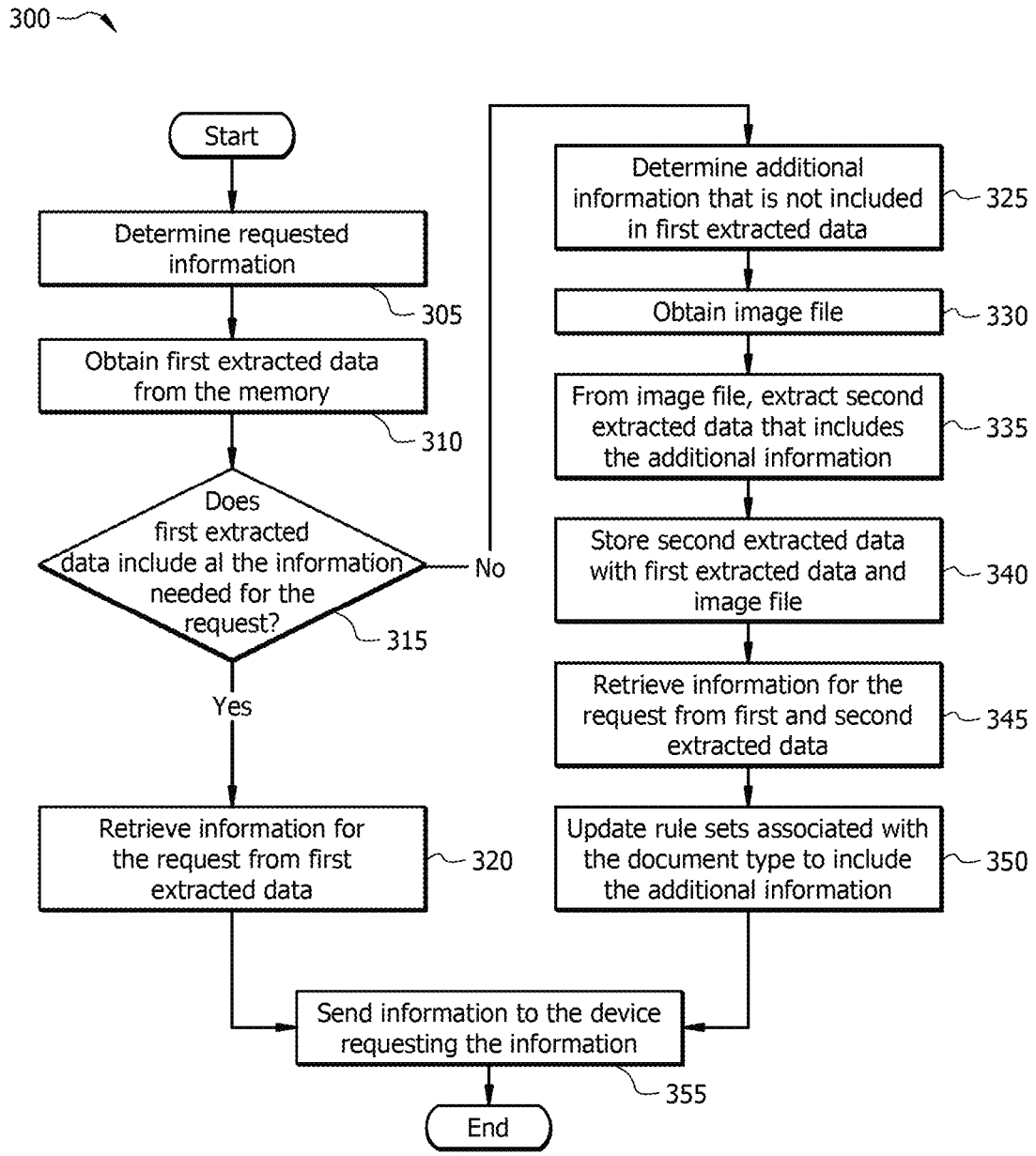
FIG. 3 is one embodiment of a method of providing requested information.

The memory 104 stores instructions 130 that when executed by processor 102, causes the processor 102 to perform the operations that are described in FIGS. 1-3. The instructions 130 may comprise any suitable set of instructions, logic, rules, or code.

The memory 104 may also include storage for the first extracted data 134 and second extracted data 136 and machine-readable image 132. While only a first extracted data 134 and second extracted data 136 are shown, any number of additional extracted data may be stored in the memory 104. The first extracted data 134, second extracted data 136, and machine-readable image 132 may be stored together or may be stored separately.

The memory 104 may include storage that takes the form of a database for storing the machine-readable image 132, first extracted data 134, and second extracted data 136. Additional data 138 such as additional extracted data, metadata and/or other types of indexing and sorting data may also be stored in the memory 104. This additional data 138 may allow the processor 102 to access the stored first extracted data 134, second extracted data 136 and/or machine-readable images 132 when requested, using known protocols such as SQL, XML, and/or any other protocol or language that a user, administrator, or developer of the document processing system 100 wishes to use. The memory 104 may also store rule sets 140 that are specific to each document type 142. The rule sets 140 are used and updated as described below with regards to the methods shown in FIGS. 2-4.

Source Document Classification and Extraction Process

FIG. 2 is a flowchart of an embodiment of a method 200 for receiving a source document, classifying the source document, extracting data from the source document, and storing the extracted data. The processor 102 may execute instructions 130 stored in the memory 104, that employ the method 200 for extracting data to provide requested information 118 to one or more requesting processes 146 hosted by local processors 112B and local memory 114B of the local devices e.g., 108B.

At operation 205, a source document 110 is received by a local device 108A. Alternatively, the source document 110 may be produced by the local device 108A. The source document 110 may be in an electronic form or may be a physical document. The source document 110 may be received from an external source such as a courier service, a different department, office, or from a user. The source document may be produced by one or more other operations or processes being executed on the local processors 112A on the local devices 108A. The source document may be actively produced by a user or system, or may be produced passively such as, but not limited to, by a security camera, a system log, or chat room recording.

Once the source document 110 is received at operation 205, the method 200 proceeds to operation 210. At operation 210, the preprocessing operation 144 is performed by the local processors 112A based on instructions stored in the local memory 114A. When the source document 110 is a physical document, the local device 108A may scan the document using a scanner or camera (not shown) to convert the physical document into a machine-readable image 132 of a predetermined machine-readable image file type. Alternatively, if the source document 110 is already in an electronic form, it is determined if the source document 110 is in the form of the predetermined machine-readable image type and, if not, it is converted by the local processor 112A to a machine-readable image 132 of the predetermined machine-readable image type, such as performing natural language processing on a video to produce a transcript, optical character recognition (OCR) on a text image file, image correction, and/or performing any other preprocessing operations needed to convert the source document 110 to a useful machine readable image 132. Other forms of preprocessing operations 144 may be performed by the local processors 112A depending on the type of source document 110, system requirements, and/or other requirements determined by a user, administrator, developer, or other concerned party using the document processing system 100. Once the preprocessing operation 144, if needed, is completed by the local processors 112A, the source document 110, in the form of a machine-readable image 132, is then forwarded to the processor 102 through the network 106.

At operation 215 the processor 102 receives the machine-readable image 132 from the local device 108A. The processor 102 then performs a classifier operation 120 which classifies the machine-readable image 132 to determine a document type 142. Based on a predetermined rule set 140, the classifier operation 120 may recognize what document type 142 the source document 110 and/or machine-readable image 132 is. The processor 102 performing the classifier operation 120 determines the document type 142 based on such things as the document's size, metadata, source, labels, certain words or phrases, and other information. For example, in a non-limiting example, if a first source document 110 is a receipt, the processor 102 may recognize the source document 110, in the form of a machine-readable image 132, as a receipt by recognizing the words "Receipt" on the document or based on it having an itemized listing of products and/or services and their prices along with a pin or signature for authorizing the purchase(s). Further if the source document 110 was originally electronic, an indication that it is a receipt may be included in the metadata associated with the image, which the processor may have instructions 130 to recognize. If a second source document e.g., 110 starts with "Dear John" the processor 102, may then recognize it as a letter or email, and after further searching the machine-readable image 132, the processor 102 may recognize a physical address indicating that the document may be a letter. If a third source document e.g., 110 is a video with two users talking to each other it may be labeled as a chat-room video. Alternatively, or in addition, the processor 102 may use machine learning or other automated means to determine a document type 142 and/or other useful criteria for classifying the document.

Once the document is classified by the processor 102 at operation 215, the method 200 proceeds to operation 220. At operation 220 the processor 102 determines what information is requested by the current requests 116 and rule sets 140 associated with the document type 142. The rule sets 140 and current requests may be stored in the memory 104 as part of the instructions 130. These rule sets 140 may be document type 142 specific and/or may include some sets that are specific to a group of documents. For example, correspondence type documents may be subject to a rule that requires that the sender's address, and name be extracted. Whereas an email may have a specific rule to extract the IP address or recipient's email address. The rule set 140 may include rules specified by specific regulations, for example financial regulations or industry specific regulations. The set of rules may also include rules identifying data that is to be extracted for current or pre-existing requests.

At operation 225, data associated with the requested information 118 is extracted by the processor 102 performing a data extractor operation 122 from the machine-readable image of the source document. The processor 102 reviews the machine-readable image 132 and based on the rule sets 140, extracts the data from the corresponding locations on the document. For documents that have information in set places, such as a check, this may be trivial, however on other documents such as correspondence or large documents like mortgage applications, this may require pattern recognition extensive text searching, and/or the performance of machine learning algorithms to identify the requested information 118.

When unsuccessful, the processor 102 may alert a user or administrator so that they may verify that either the information is not present or find the information. If the user or administrator does find the information, they may use this to update the data extractor's protocols for finding information, alternatively or in addition, if the processor 102 when performing a data extractor operation 122 uses machine learning, the results may be used for re-training.

When successful, the processor 102 extracts the first extracted data 134 from the source document 110 and sends this data to the memory 104 for storage at operation 230. At operation 230, the first extracted data 134 and machine-readable image 132 are stored in the memory 104 by the processor 102. The data and image may be stored in any form useful and/or efficient for retrieving the first extracted data 134 and machine-readable image 132. The form used to store the data and image may also be determined based on the type of storage the memory 104 uses and other factors related to the hardware and/or software used for storing the first extracted data 134 and machine-readable image 132.

In at least one embodiment, the first extracted data 134 and machine-readable images 132 are stored in a database. This may be any of a structural database, relational database, NoSQL database, object database, document-oriented database or any other type of database which allows the machine-readable image 132 to be associated with the first extracted data 134, as well as any future extracted data such as second extracted data 136. Further the first extracted data 134 and machine-readable image 132 may be saved to locations where other extracted data and image files of the same document type 142 are stored. These locations may be on one or more common storage mediums or may be spread across multiple storage mediums, such as, but not limited to, cloud storage.

Once the first extracted data 134 and machine-readable images 132 are stored in the memory 104 by the processor 102, the method 200 proceeds to operation 235. Operation 235 may occur immediately after operation 230 or may occur sometime later, such as, but not limited to, hours, days, week, months, years later. At operation 235, a request 116 is received by the processor 102 from a requesting process 146 hosted by a local device 108B. The request 116 received from the requesting process 146 may include specific requested information 118 from one or more document types 142, or the specific source document 110 received in operation 205. The requesting processes 146 do not necessarily have knowledge of what data has been previously extracted from the source document(s) 110. Alternatively, or additionally, the requesting processes 146 may be requesting the use of a different process or version of a process to extract the same data or a different version of the data that had been previously extracted from the source document(s) 110.

The processor 102 may also send a message to the local device 108B indicating that the requests 116 have been received. This message may also include such information as an estimate of how long it will take to process the requests 116, and/or if identical requests 116 have already been received. These messages alternatively may be sent directly to the user of the local device 108B and may take any form.

At operation 240, after the processor 102 performing the data manager operation 124, receives the request 116 from the requesting processes 146, the processor 102 then determines what data or information is being requested by the requesting processes 146 and how to retrieve it. The processor 102 retrieves the requested information 118 from the first extracted data 134 and provides, through the network 106, the requested information 118 to the local processors 112B executing the requesting processes 146. Alternatively, the processor 102 may send a message to the local processors 112B and/or users of the local processors 112B, that indicates an alternative location where the requested information 118 is to be provided such as, but not limited to, shared storage, a cloud location, a URL, or other locations and/or storage types.

A method 300 of providing the requested information 118 to the device requesting it is described in FIG. 3. Other methods may be used without out departing from the disclosure. At operation 245 the processor 102 determines if the rule sets 140 for the determined document type 142 have changed, as a result of the request 116 received in operation 235 or as a result of changes in regulations and/or other rules. If the rule sets 140 have changed, the method 200 proceeds to operation 250. Where the rule sets 140 are updated by the processor 102 to include any additional data 138 and/or information requested by the new request 116 received in operation 235 or as a result in changes in rules or regulations that affect the extracted data such as: first extracted data 134, second extracted data 136, and the machine-readable image 132 stored in the memory 104. A method 400 for updating the rule sets 140 is described in FIG. 4, other methods may be used without out departing from the disclosure.

Once the rule sets 140 are updated by the processor 102 in operation 250 or it is determined that the rule sets 140 have not changed, the method 200 proceeds to operation 255. In operation 255, the processor 102 monitors for additional requests 116 from new or old requesting processes 146 as well as any changes to the rule sets 140. When new requests 116 or changes are received, the processor repeats operations 235-255. The processor 102 also monitors for any new source documents 110 being received by the local device 108A, and when new source documents 110 are received by the local devices 108A, the processor 102 and/or local processor 112A cause operations 205-255 to be repeated. After operation 255 the method 200 may end, until a new source document 110 is received, additional requests 116 are received, or changes to one or more of the rule sets 140 are required.

Providing Requested Information Process

FIG. 3 is a flowchart of an embodiment of a method 300 for providing requested information to a requesting device or process. The processor 102 may execute instructions 130 that employ the method 300 for providing the requested information 118 to one or more requesting processes 146. Specifically, the processor 102 executes data extractor operations 122, and data manager operations 124 to provide the first extracted data 134 from the memory 104 and/or extract and provide the second extracted data 136 from the machine-readable image 132 stored in the memory 104. The method 300 in FIG. 3 may be performed as part of operation 240 described in FIG. 2 or may be performed as a stand-alone method.

At operation 305 a request 116 for information is received, and the processor 102 determines what information is being requested in the request 116. The processor 102 analyzes the request 116 and determines if the request is in compliance with the rule sets 140 governing the document type 142 the data is being requested from. If the request 116 is not in compliance, the processor 102 provides any data, that is in compliance to the requesting processes 146, to the local device 108B and notifies the requesting processes 146 hosted by the local device 108B, that parts of the request 116 are not in compliance. For example, if the requests 116 include a data field that a particular local device 108B does not have permission to access, the processor 102 then provides a notification to the local device 108B along with any requested information 118 that is in compliance. Alternatively, or in addition, the processor 102 may provide a different version of the requested information 118 to the local device 108B, where the different version has the sensitive information masked or un-masked based on the level of access a particular requesting process 146 has been granted. In general, however, the request 116 will be in compliance, and the request 116 are for one or more fields or other data from the machine-readable image 132 of the source document 110.

At operation 310, once the particular fields or types of data are determined by the processor 102 performing data manager operations 124, the processor 102 obtains the first extracted data 134 from the memory 104. The first extracted data 134 is retrieved and provided to the processor 102 which looks for the requested information 118 in the first extracted data 134.

At operation 315, the processor 102 then determines if the first extracted data 134 includes all the requested information 118. If the first extracted data 134 includes all the requested information 118, then the method 300 proceeds to operation 320, and the requested information 118 is retrieved from the first extracted data 134 by the processor 102.

If, however, the first extracted data 134 does not include all the requested information 118, the method 300 proceeds to operation 325. At operation 325, the processor performing data manager operations 124, determines what additional data 138 that is not include in the first extracted data 134 should be extracted. For example, in a non-limiting example, if first extracted data 134 includes an amount and an account number, but does not include the account holder's address, when a request for an account number and account holder's address is received, at operation 325 the determination is made by the processor 102 that the first extracted data 134 does not include the account holder's address.

At operation 330, once additional information is determined by the processor 102, the processor 102 obtains the machine-readable image 132 for the source document 110 from the memory 104. The processor 102 then performs the data extractor operations 122 on machine-readable image 132 to extract the additional information in the form of second extracted data 136.

At operation 335, the processor 102 extracts a second extracted data 136, or additional data 138 such as extracted data when second extracted data 136 already exists from the machine-readable image 132, that includes the additional information that was identified in operation 325. The processor 102 reviews the machine-readable image 132 and extracts the additional data 138 to fulfill the request. The processor 102 may, only extracts the data that is not already included in the first extracted data 134. This prevents redundant data being produced which may slow the document processing system 100 or unnecessarily use excessive resources of the memory 104. However, the disclosure is not limited to having the processor 102 only extract non-redundant data Once the second extracted data 136 is extracted by the processor 102 from the machine-readable image 132 in operation 335, the method 300 proceeds to operation 340. At operation 340 the processor 102 causes the second extracted data 136 to be stored in the memory 104 along with the first extracted data 134 and machine-readable image 132. Any subsequent additional data 138 extracted due to future requests are also stored with the first extracted data 134 and machine-readable image 132 along with the second extracted data 136. In at least one embodiment the second extracted data 136 is combined with the first extracted data 134 to form a combined extracted data (not shown) that for future requests will be considered the first (or pre-existing) extracted data 134. Alternatively, each iteration of extracted data is stored separately, but in such a way that the extracted data for a specific source document 110 may be easily retrieved by the processor 102 to provide requested information 118 to one or more local processors 112B that are executing requesting processes 146.

At operation 345, which may be performed after the second extracted data 136 is stored at operation 340 or at the same time, the processor 102 retrieves the requested information 118 for the request 116 from the first extracted data 134 and second extracted data 136. Then in operation 350, the processor 102 updates the rule sets 140 for the document type 142 to include the additional information that was determined in operation 325. The updated determined information may be used to update the rules set 140 associated with the document type 142 as will be described in more detail below with regards to the method 400 shown in FIG. 4.

At operation 355, the requested information 118 retrieved from the first extracted data 134 in 320 or from both the first extracted data 134 and second extracted data 136 in operation 345 by the processor 102, is then sent by the processor 102 over the network 106 to the requesting local device 108B that is hosting the requesting processes 146. Once the requested information 118 is sent by the processor 102 to the requesting local device 108B in operation 355, the method 300 may end.

Updating Rule Set Process

Figure 4:
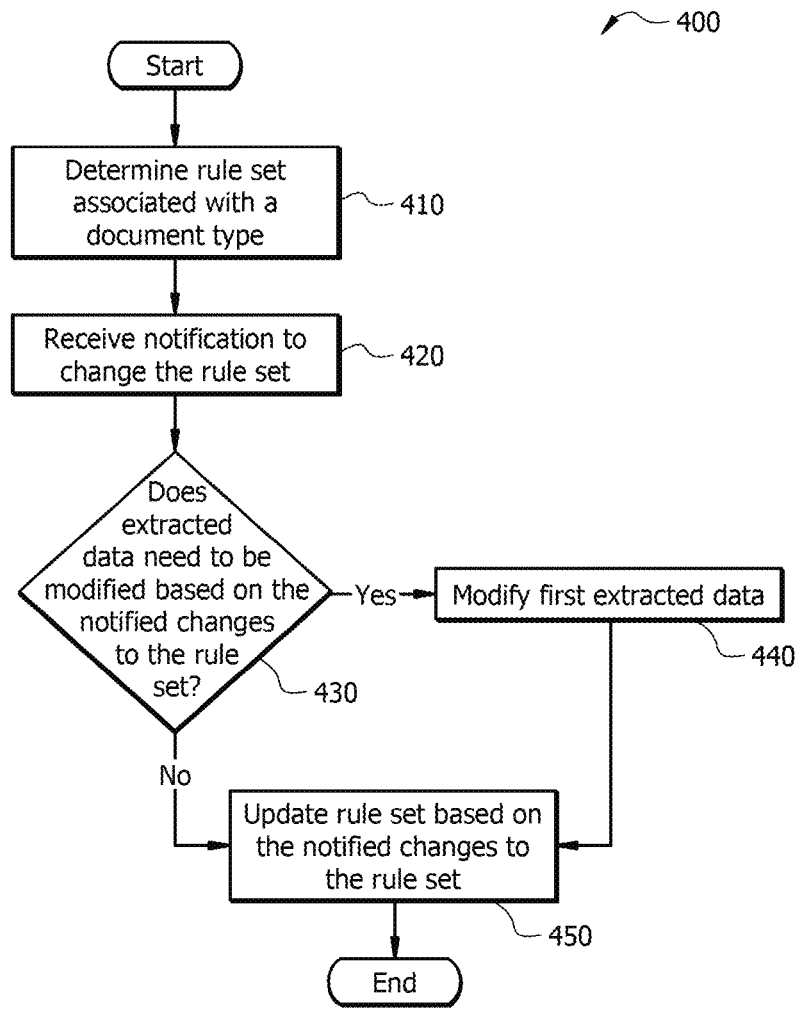
FIG. 4 is one embodiment of a method of updating a rule set associated with a document type.

FIG. 4 is a flowchart of an embodiment of a method 400 for updating the rule sets 140. The processor 102 may execute instructions 130 that employ the method 400 for updating one or more of the rule sets 140 which may be stored along with the instructions 130 in the memory 104 or stored with the first extracted data 134, second extracted data 136, and machine-readable images 132. The method 400 in FIG. 4 may be performed as part of operation 255 described in FIG. 2 or may be performed as a stand-alone method.

At operation 410 the processor 102 retrieves from memory 104 or determines the contents of the current rule sets 140 associated with a specific document type 142. These rule sets 140 may be based on document retention policies, regulatory policies, security policies, permissions, pre-existing requesting processes 146, and/or other policies or processes. Other sources of the rule sets 140 may be used without departing from the disclosure, including those determined by a user, administrator, developer, or other concerned party.

At operation 420, the processor 102 performing data manager operations 124 determines what if any changes are needed to the rule sets 140. For example, as a result of changes in a company's document retention policies, updated or changed extraction algorithms, or changes in regulations concerning the company's lines of business, changes may be needed to the rule sets 140 so that some types of data are not retained, or additional data 138 may be retained that was not previously retained. Further when a local device 108B requests 116 requested information 118 for a new requesting process 146, not previously included in at least the first extracted data 134, the rule sets 140 are updated to include that information so that future extractions will extract the information for the new process as well as the other pre-existing processes.

At operation 430 the processor 102 determines if, as a result of changes to the rule set 140, the first extracted data 134 and/or the second extracted data 136 are to be modified based on the changes to the rule sets 140. If the changes in the rule sets 140, do not require modification of the first extracted data 134 and/or the second extracted data 136 and additional data 138 then the method 400 proceeds to operation 450. If the processor 102 determine that first extracted data 134 and/or the second extracted data 136 need to be modified based on the changes to the rule set, then the method 400 proceeds to operation 440.

At operation 440 the first extracted data 134 and/or the second extracted data 136 that is associated with the specific document type 142, is modified by the processor 102. This may include deleting some of the data included in the first extracted data 134 and/or the second extracted data 136, or this may include modifying the data in a different manner, such as re-organizing it, archiving it, or any other modification that a change in the rule sets 140 requires. This may also require the processor 102 to extract the data in a different manner to produce a different version of the either the first extracted data 134 and/or the second extracted data 136. Further this may require extracting additional data 138 using the processes described above with regards to FIGS. 2 and 3. For example, in a non-limiting example, when a rule change requires that social security numbers no-longer be retained, any social security numbers in the first extracted data 134 and/or the second extracted data 136 would then be deleted by the processor 102. In a second non-limiting example, if a new requesting process 146 sends a request 116 for all signatures, then all machine-readable images 132 that include signatures would have the signatures extracted and stored by the processor 102 to second extracted data 136. In a third non-limiting example, if a new machine learning algorithm is introduced for determining the mood of participants in chats, then the processor 102 would execute the new machine learning algorithm to extract the mood of participants and would replace any old mood data in the first extracted data 134 and/or second extracted data 136 with the newly extracted mood data.

Once the first extracted data 134 and/or the second extracted data 136 and additional data 138 is modified in operation 440, or when no modifications are to be performed as determined by the processor 102 in operation 430, the method 400 proceeds to operation 450. At operation 450 the rule sets 140 for the determined document type 142 are updated by the processor 102 to reflect the determined changes. This ensures that any future source documents 110 of the same type, have the information requested by the current rule sets 140 extracted. Once operation 450 is completed the method 400 may end.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 140(f) as it exists on the date of filing hereof unless the words "means for" or "operation for" are explicitly used in the particular claim.

The invention claimed is:

1. A system for extracting and providing information from a source document, the system comprising:
 a memory configured to store data associated with the source document; and
 a processor operably coupled to the memory and configured to:
  receive the source document;
  store in the memory the source document as a machine-readable image;
  extract data from the source document;
  store the extracted data as a first extracted data in the memory, wherein the first extracted data is associated with the machine-readable image;
  receive a request for information;
  determine if the first extracted data includes all the requested information;
  extract second extracted data from the machine-readable image when the first extracted data does not include all the requested information;
  store the second extracted data in the memory, wherein the second extracted data is associated with the first extracted data and the machine-readable image; and
  retrieve the requested information from the first and second extracted data.

2. The system of claim 1, wherein the processor is further configured to:

determine, prior to storing the source document in the memory, if the source document is in a form of an image file; and perform pre-processing of the source document when it is determined that the source document is not in the form of an image file, wherein the pre-processing comprises at least one of:

scanning the source document when the source document is a physical document, to produce the machine-readable image; or converting the source document to a predetermined machine-readable image type when the source document is an electronic document, to produce the machine-readable image.

3. The system of claim 1, wherein the data that is extracted from the source document is determined based on at least one rule set that is associated with a document type of the source document.

4. The system of claim 3, wherein the processor is further configured to:

modify the first extracted data to delete an element of the first extracted data when the at least one rule set is changed to require that the element no longer be stored.

5. The system of claim 1, wherein the processor is further configured to:

receive an additional request for information;
determine if the first and second extracted data includes all the information requested by the additional request;
extract additional extracted data from the machine-readable image when the first extracted data and the second extracted data do not include all the information requested by the additional request;
store the additional extracted data in the memory, wherein the additional extracted data is associated with the first extracted data, the second extracted data, and the machine-readable image; and
retrieve the information requested by the additional request from the first, second, and the additional extracted data.

6. The system of claim 1, wherein:
the first and second extracted data does not contain redundant data.

7. The system of claim 1, wherein the data that is extracted is determined based on at least one previous request.

8. A method for extracting and providing information from a source document, comprising:
receiving the source document;
storing in a memory the source document as a machine-readable image;
extracting data from the source document;
storing the extracted data as a first extracted data in the memory, wherein the first extracted data is associated with the machine-readable image;
receiving a request for information;
determining if the first extracted data includes all the requested information;
extracting second extracted data from the machine-readable image when the first extracted data does not include all the requested information;
storing the second extracted data in the memory, wherein the second extracted data is associated with the first extracted data and the machine-readable image; and
retrieving the requested information from the first and second extracted data.

9. The method of claim 8, further comprising:

determining, prior to storing the source document in the memory, if the source document is in a form of an image file; and performing pre-processing of the source document when it is determined that the source document is not in the form of an image file, wherein the pre-processing comprises at least one of:

scanning the source document when the source document is a physical document, to produce a machine-readable image; or converting the source document to a predetermined machine-readable image type when the source document is an electronic document, to produce the machine-readable image.

10. The method of claim 8, wherein the data that is extracted from the source document is determined based on at least one rule set associated with a document type of the source document.

11. The method of claim 10, further comprising:
modifying the first extracted data to delete an element of the first extracted data when the at least one rule set is changed to require that the element no longer be stored.

12. The method of claim 8, further comprising:
receiving an additional request for information;
determining if the first and second extracted data includes all the information requested by the additional request;
extracting additional extracted data from the machine-readable image when the first extracted data and the second extracted data do not include all the information requested by the additional request;
storing the additional extracted data in the memory, wherein the additional extracted data is associated with the first extracted data, the second extracted data, and the machine-readable image; and
retrieving the information requested by the additional request from the first, second, and the additional extracted data.

13. The method of claim 8, wherein:
the first and second extracted data does not contain redundant data.

14. The method of claim 8, wherein the data that is extracted is determined based on at least one previous request.

15. A non-transitory computer-readable medium storing instructions that when executed by a processor cause the processor to:
receive a source document;
store in a memory the source document as a machine-readable image;
extract data from the source document;
store the extracted data as a first extracted data in the memory, wherein the first extracted data is associated with the machine-readable image;
receive a request for information;
determine if the first extracted data includes all the requested information;
extract second extracted data from the machine-readable image when the first extracted data does not include all the requested information;
store the second extracted data in the memory, wherein the second extracted data is associated with the first extracted data and the machine-readable image; and
retrieve the requested information from the first and second extracted data.

16. The non-transitory computer-readable medium of claim 15, wherein the instructions further cause the processor to:

determine, prior to storing the source document in the memory, if the source document is in a form of an image file; and perform pre-processing of the source document when it is determined that the source document is not in the form of an image file, wherein the pre-processing comprises at least one of:

scanning the source document when the source document is a physical document, to produce the machine-readable image; or converting the source document to a predetermined machine-readable image type when the source document is an electronic document, to produce the machine-readable image.

17. The non-transitory computer-readable medium of claim 15, wherein the data that is extracted from the source document is determined based on at least one rule set that is associated with a document type of the source document.

18. The non-transitory computer-readable medium of claim 17, wherein the instructions further cause the processor to:

modify the first extracted data to delete an element of the first extracted data when the at least one rule set is changed to require that the element no longer be stored.

19. The non-transitory computer-readable medium of claim 15, wherein the instructions further cause the processor to:

receive an additional request for information;

determine if the first and second extracted data includes all the information requested by the additional request;

extract additional extracted data from the machine-readable image when the first extracted data and the second extracted data do not include all the information requested by the additional request;

store the additional extracted data in the memory, wherein the additional extracted data is associated with the first extracted data, the second extracted data, and the machine-readable image; and retrieve the information requested by the additional request from the first, second, and the additional extracted data.

20. The non-transitory computer-readable medium of claim 15, wherein the data that is extracted is determined based on at least one previous request.

\* \* \* \* \*